United States Patent
Ito et al.

(10) Patent No.: US 6,998,971 B2
(45) Date of Patent: Feb. 14, 2006

(54) IN-VEHICLE-DEVICE CONTROL SYSTEM VARYING MANIPULATION ITEM DISPLAY

(75) Inventors: Yuji Ito, Okazaki (JP); Nobuaki Koshobu, Kariya (JP); Takayoshi Kawai, Hoi-gun (JP); Akira Kamiya, Chiryu (JP)

(73) Assignee: DENSO Corporation, Kariya (JP)

( * ) Notice: Subject to any disclaimer, the term of this patent is extended or adjusted under 35 U.S.C. 154(b) by 44 days.

(21) Appl. No.: 10/436,524

(22) Filed: May 13, 2003

(65) Prior Publication Data

US 2003/0216816 A1    Nov. 20, 2003

(30) Foreign Application Priority Data

May 16, 2002    (JP)    ............... 2002-141061

(51) Int. Cl.
*B60Q 1/00*    (2006.01)
(52) U.S. Cl. .................. 340/438; 340/459; 340/461
(58) Field of Classification Search ............ 340/425.5, 340/945, 971, 438, 461, 984, 459; 701/1, 701/36
See application file for complete search history.

(56) References Cited

U.S. PATENT DOCUMENTS

| | | | |
|---|---|---|---|
| 5,732,368 A * | 3/1998 | Knoll et al. ................. 701/1 |
| 5,765,123 A * | 6/1998 | Nimura et al. ............ 701/208 |
| 6,484,094 B1 * | 11/2002 | Wako ...................... 701/211 |
| 6,529,125 B1 * | 3/2003 | Butler et al. ............. 340/461 |
| 6,539,289 B1 * | 3/2003 | Ogino et al. ................. 701/1 |
| 6,581,001 B1 * | 6/2003 | Katsuka et al. ........... 701/209 |
| 6,587,759 B1 * | 7/2003 | Obradovich et al. ......... 701/1 |

* cited by examiner

*Primary Examiner*—Brent A. Swarthout
(74) *Attorney, Agent, or Firm*—Harness, Dickey & Pierce, PLC

(57) ABSTRACT

A manipulation display area and an operation state display area are disposed in a display. The manipulation display area is divided into a constant area and a variable area. The constant area includes manipulation items to be most frequently selected by a user, while the variable area includes manipulation items to be altered according to use condition. Thereby the user can easily reach a necessary manipulation item among a lot of the manipulation items.

3 Claims, 6 Drawing Sheets

IN-VEHICLE-DEVICE CONTROL SYSTEM VARYING MANIPULATION ITEM DISPLAY

CROSS REFERENCE TO RELATED APPLICATIONS

This application is based on and incorporates herein by reference Japanese Patent Application No. 2002-141061 filed on May 16, 2002.

FIELD OF THE INVENTION

The present invention relates to an in-vehicle-device control system where a user searches a manipulation display for a necessary manipulation item among a plurality of manipulation items.

BACKGROUND OF THE INVENTION

In an instrument panel in a vehicle, there are a manipulation area, formed of a plurality of switches for manipulating in-vehicle devices, and a displaying area, for displaying operating states of the in-vehicle devices. Recently, appearance of an intelligent transport system (ITS) represented by a navigation system and an adaptive cruise control system (ACC) exhibits increasing of the number of the in-vehicle devices and enhancing performance of the in-vehicle devices. The switches for manipulating the in-vehicle devices thereby have a tendency to increase. Therefore the instrument panel needs to be designed so that the manipulation area and the displaying area can be arranged with user-friendliness in a limited area of the instrument panel.

An instance shown in FIG. 6A is proposed for an in-vehicle-device system. This in-vehicle-device system includes a panel electronic control unit (ECU) 3, a manipulation panel 1, and a display 2. The panel ECU 3 is communicated with various ECUs 4, 5, 6 via a multiplex signal line 7. The manipulation panel 1 is a manipulation area through which a user selectively operates an in-vehicle device. The manipulation panel 1 includes a set of function keys 11, a dial 12, a directional switch 13, and the like. The set of the function keys 11 are used for calling a manipulation menu of each in-vehicle device including a navigation system, an air-conditioner, and an audio. When the user wishes to modify a blow mode of the air-conditioner, a function key 11 corresponding to a manipulation menu for the air-conditioner is selected. The manipulation menu including a plurality of manipulation items is thereby displayed as shown in FIG. 6B. The user then selects a necessary manipulation item from the menu through manipulating the directional switch 13 to modify the blow mode. Similarly in the navigation system and the audio, the user operates each in-vehicle device by selecting a necessary manipulation item with a corresponding function key 11 and the directional switch 13.

Thus displaying respective manipulation menus for the in-vehicle devices on the display 2 and adopting the directional switch 13 for a common manipulation area are designed to decrease the number of manipulation parts or displaying areas.

However, in the above in-vehicle-device control system, the manipulation menu displayed on the display 2 includes many items in one display window as shown in FIG. 6B. In addition, one display window also displays, every in-vehicle device, various manipulation menus also including many manipulation items. It is therefore difficult for the user to quickly select a necessary item, which results in involving a useless manipulation period up to completing to operate a necessary in-vehicle device.

SUMMARY OF THE INVENTION

It is an object of the present invention to provide an in-vehicle-device control system where a user easily searches for a necessary manipulation item among a plurality of manipulation items.

To achieve the above object, an in-vehicle-device control system is provided with the following. A display is disposed for displaying a plurality of manipulation items. Here, the display includes a variable area and a constant area. A first part of the manipulation items are displayed in the variable area. A second part of the manipulation items are displayed in the constant area. A selecting area is disposed for the user to select a necessary manipulation item from the manipulation items displayed on the display. An in-vehicle device is controlled to operate correspondingly to the necessary manipulation item selected by the user. Furthermore the first part of the manipulation items in the variable area are altered based on use condition for the first part of the manipulation items. This structure enables a necessary manipulation item to be properly displayed, so that the user can easily and quickly search for the necessary manipulation item.

It is preferable that the first part of the manipulation items are re-arranges based on use condition of selection frequency at which each of the first part of the manipulation items is selected by the user. It is preferable that the first part of the manipulation items are re-arranges based on use condition chosen from a day of a week, a season, a time zone of a day, an interior and exterior temperature, or a state of the user. Furthermore, it is preferable that the first part of the manipulation items are re-altered only when predetermined condition is adequate.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
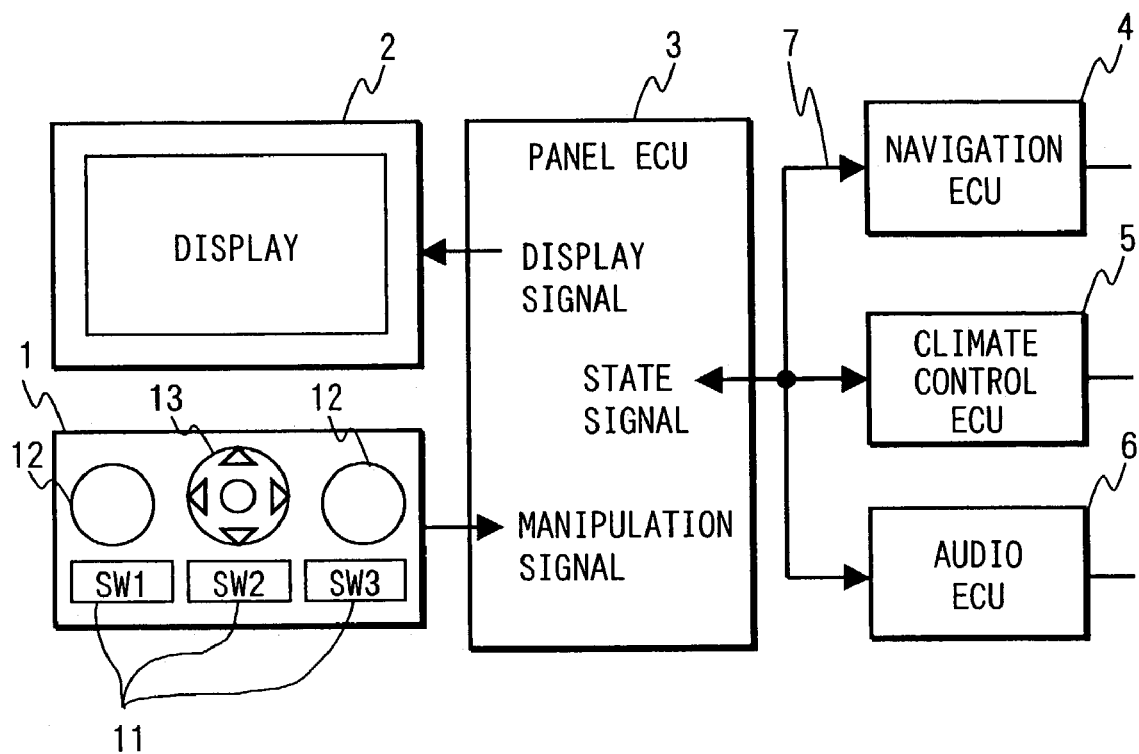
FIG. 1 is a schematic diagram showing related connection of an in-vehicle-device system according to an embodiment of the present invention.

An in-vehicle-device control system as an embodiment of the present invention will be explained. As shown in FIG. 1, the in-vehicle-device control system includes a panel ECU 3, a manipulation panel 1, and a display 2. The panel ECU 3 is communicated with the manipulation panel 1 and the display 2. The panel ECU 3 is also communicated with other ECUs 4, 5, 6 controlling other in-vehicle devices via a multiplex signal line 7.

The manipulation panel 1 includes a set of function keys 11, a dial 12, and a directional switch 13. The set of the function keys 11 are formed of push switches SW1, SW2, SW3 that are used for calling manipulation menus of a navigation system, an air-conditioner, and an audio, respectively. When the push switch SW2 is manipulated, a manipulation menu of the air-conditioner is shown in the display 2.

The dial 12 is used for manipulating adjustment of sound volume in the audio or modification of scale of a road map in the navigation system. The directional switch 13 is used for switching manipulation items in the manipulation menu through pushing switching points disposed at the rightmost/leftmost and uppermost/lowermost of the directional switch 13. The directional switch 13 is also used for selecting or determining a manipulation item in the manipulation menu through pushing the center point of the directional switch 13. The directional switch 13 in the manipulation panel 1 can be replaced with a track ball, a joy stick, or a manipulation part that is constructed by a touch panel provided in a display 2.

The display 2 is formed of a liquid crystal display. The display 2 shows the respective manipulation menus for the in-vehicle devices and operation states of the in-vehicle devices. The displayed images are determined by a display command signal from the panel ECU 3. The liquid crystal display can be replaced with a self-luminous type display such as a vacuum fluorescent display (VFD) or electro-luminescent (EL) display.

The multiplex signal line 7 is a transmission line used for, for instance, an in-vehicle local area network (LAN). This multiplex signal line 7 is used for communication among the panel ECU 3 and other ECUs 4, 5, 6 as shown in FIG. 1.

Thus the above in-vehicle-device control system adopts common structure for manipulating display, the structure where a manipulation item in a manipulation menu shown in a display 2 is selected to be operated through a manipulation panel 1.

As explained above, the panel ECU 3 communicated with the ECUs 4, 5, 6 via the multiplex signal line 7 exchanges transmission and reception signals with them via the multiplex signal line 7. For instance, as shown in FIG. 1, as the user select a necessary manipulation item through the manipulation panel 1, a manipulation signal corresponding to an attribute of the manipulation item is transmitted from the manipulation panel 1 to the panel ECU 3. The panel ECU 3 then transmits, to the ECUs 4, 5, 6, a control signal corresponding to the received manipulation signal. Each of the ECUs 4, 5, 6 operates respective in-vehicle devices according to the received control signal. Each of the ECUs 4, 5, 6 transmits, to the ECU 3, an operation state signal. The panel ECU 3 transmits, to the display 2, a display command signal corresponding to the received operation state signal. The display 2 shows each operation state of the in-vehicle devices corresponding to the received display command signal.

Next, referring to FIGS. 2A, 2B, 3, the display 2 will be explained. The display 2 includes a constant area where a manipulation item is fixed and a variable area where a manipulation item is altered according to user's request. Constructing these two areas is a feature of the present invention.

Figure 2A:
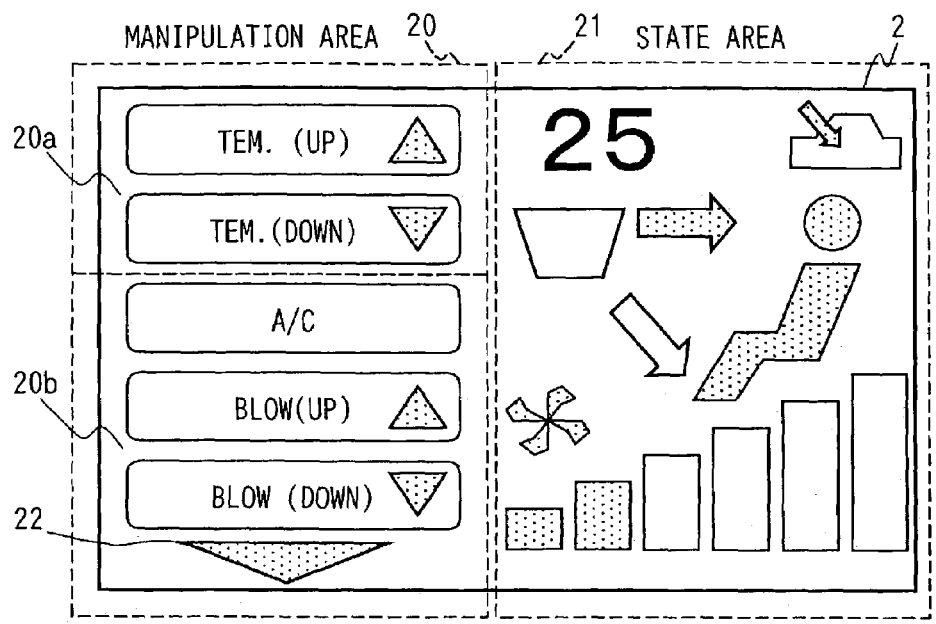
FIGS. 2A and 2B are schematic views of a display image of the in-vehicle-device control system according to the embodiment.

As shown in FIG. 2A, the display 2 includes a manipulation display area 20 and an operation state display area 21. The manipulation display area 20 includes, for instance in FIG. 2A, manipulation items for manipulating an air-conditioner. The operation state display 21 includes an operation state of the air-conditioner. As explained above, the operation state is displayed in the operation state display area 21 as follows: The panel ECU 3 receives an operation state signal from a climate control ECU 5; the display 2 receives a display command signal corresponding to the operation state signal from the panel ECU 3; and the display ECU 3 displays the operation state corresponding to the display command signal on the display 2.

The manipulation display area 20 includes a constant area 20a where the predetermined number (two items in FIG. 2A) of the manipulation items are fixed and a variable area 20b where the manipulation items are altered according to user's request. For instance, the manipulation items in the constant area 20a are items to be most frequently used. In FIG. 2A, two temperature settings (TEMPERATURE UP, TEMPERATURE DOWN), which are assumed to be most frequently used, are shown in the constant area 20a. Here, the manipulation items in the constant area can be designed to be arbitrarily altered by the user through manipulating the directional switch 13.

By contrast, the manipulation items in the variable area 20b are selected in order of frequency of user's selection of the manipulation items excluding the manipulation items already selected in the constant area. At a primary (or first) page, the predetermined number of items that are most frequently selected are displayed. Items that are selected less frequently are displayed at subsequent pages that are shown by selecting a symbol 22 indicating of turning a page shown in FIG. 2.

Figure 3:
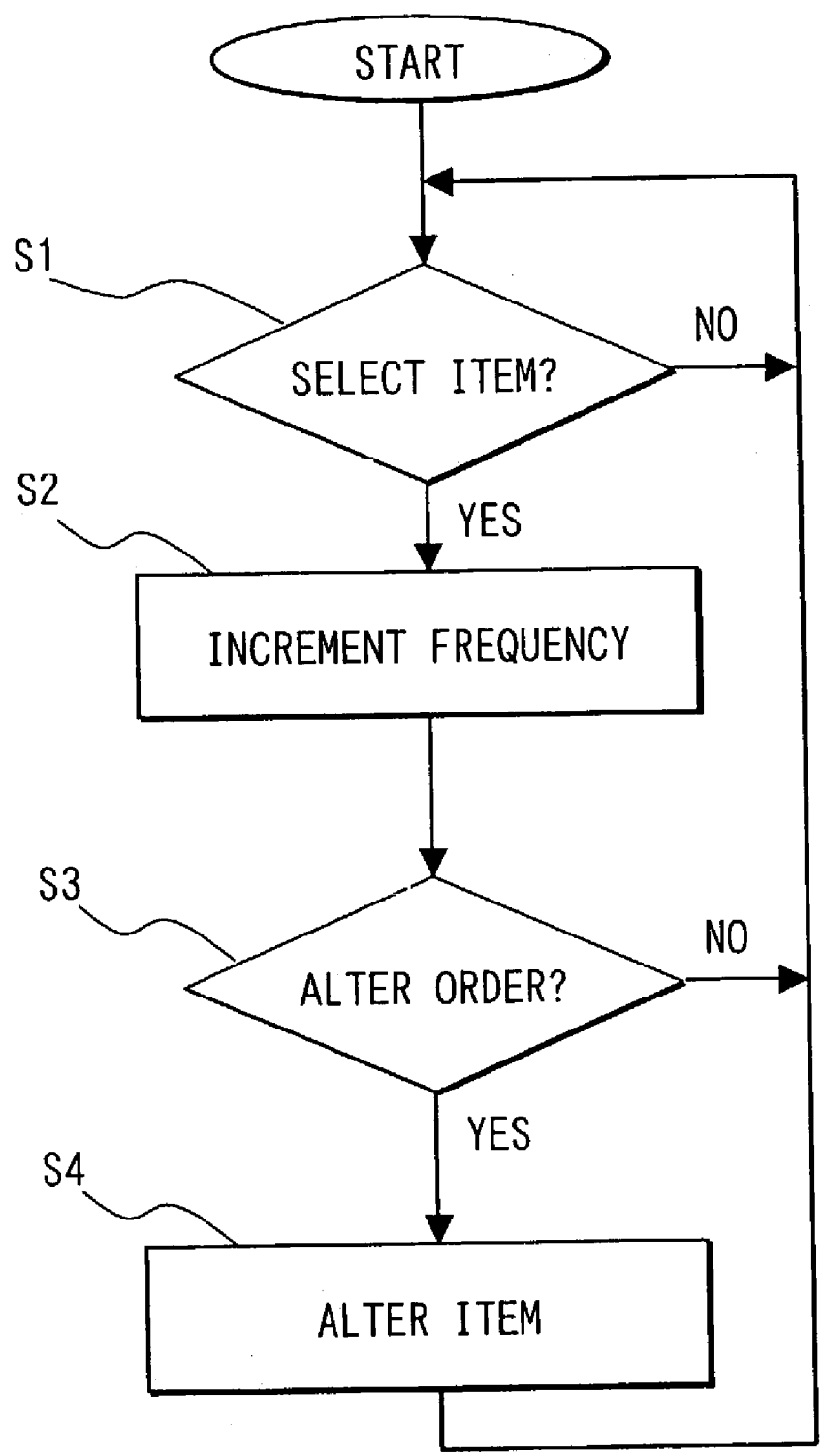
FIG. 3 is a flowchart diagram of an in-vehicle-device control system according to a first embodiment.

Referring to FIG. 3, processing for altering displayed manipulation items in the variable area 20b based on user's selection frequency will be explained. The processing is executed by the panel ECU 3.

Firstly, at Step 1, whether a manipulation item in the variable area 20b in the display 2 is selected by a user is determined. Here, items displayed in the subsequent pages by selecting the symbol 22 are included as "a manipulation item in the variable area." Here, the processing continues to wait until the user selects the manipulation item.

When the user selects a certain manipulation item in the variable area 20b, the processing proceeds to Step 2 where a selection frequency of the certain manipulation item is incremented by one to be stored. Furthermore, referring to selection frequencies of the manipulation items, in-vehicle devices are placed in a list in a frequency order.

At Step 3, whether the frequency order placed at Step 2 is changed from the preceding frequency order is determined. When the frequency order is changed, the processing proceeds to Step 4. Here, the predetermined number of the manipulation items that can be displayed in the variable area 20b in the primary page are displayed referring to the frequency order. When the frequency order is not changed, the processing returns to Step 1.

Figure 2B:
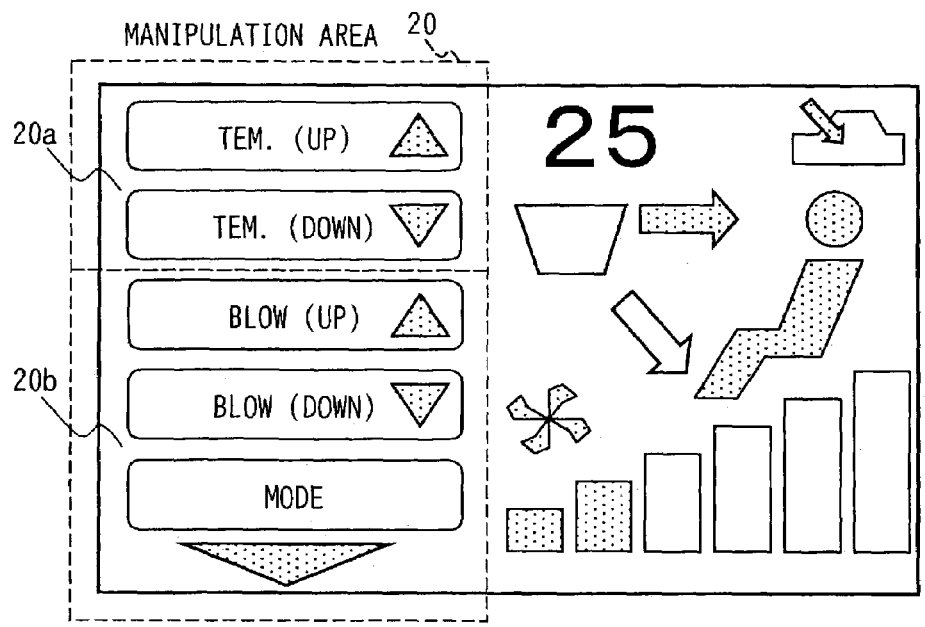

A display image shown in FIG. 2B shows an instance in which the display image is changed from a display image shown in FIG. 2A through the processing at Step 4. The variable area in FIG. 2A includes "A/C," "BLOW (UP)," and "BLOW (DOWN)," while the variable area in FIG. 2A includes "BLOW (UP)," "BLOW (DOWN)," and "MODE." In FIGS. 2A and 2B, the manipulation items in the variable area 20b are disposed in the frequency order from the higher row to lower row. Furthermore, in the subsequent pages that are displayed by selecting the symbol 22, the manipulation items are also disposed in the frequency order, within the items in each of the subsequent pages, from the higher row to lower row.

Thus, the in-vehicle-device system of the embodiment of the present invention alters the manipulation items displayed in the variable area on the display 2 based on the frequency order of the user's selection. The manipulation items are placed in the list in the order based on the frequency of the user's selection, and the manipulation items having the high selection frequency is preferentially and automatically displayed. The constant area 20a where the manipulation items are not dynamically altered is disposed in the display 2, so that the user easily searches for a necessary manipulation item to be most frequently used by firstly referring to the manipulation items in the constant area 20a.

Furthermore, only manipulation items that are most frequently selected by the user are included in the primary page while manipulation items that are less frequently selected are included in the subsequent pages that are displayed only by selecting the symbol 22 by the user. Thereby the primary page does not need to include so many manipulation items so that the user can easily search for a necessary manipulation item.

In the embodiment, although only the navigation system, the air-conditioner, and the audio are explained as the in-vehicle devices, other in-vehicle devices such as audio/visual devices of TV and video, IT devices of phone and email can be adopted in the embodiment. If the selection frequency can be externally writable, accumulated selection frequency for a user can be utilized in another in-vehicle-device control system in another vehicle. This provides the user with user-friendliness when the user changes vehicles.

(Second Embodiment)

Figure 4:
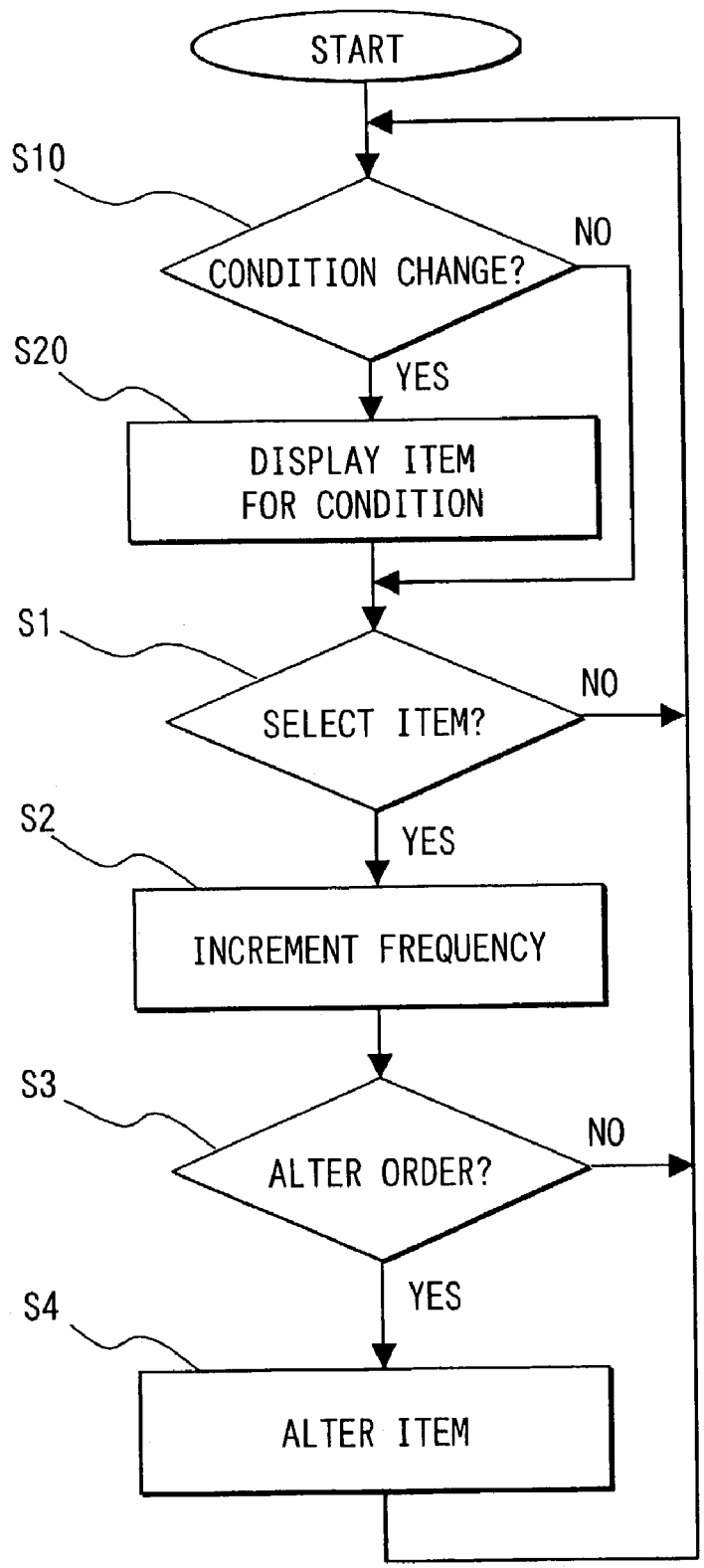
FIG. 4 is a flowchart diagram of an in-vehicle-device control system according to a second embodiment.

In a second embodiment, the manipulation items in the variable area 20b are altered based on at least one of use conditions including a day of the week, a season, a time zone of the day, an interior and exterior temperature, and a user state, while they are altered based on the frequency of user's selection in the first embodiment. Referring to FIG. 4, processing for altering displayed manipulation items in the variable area 20b based on the use condition will be explained.

Manipulating an air-conditioner is explained as an instance below. In a rainy season, windows of the interior of a vehicle are often fogged up. A user is apt to select a manipulation item for switching to a mode of introducing an exterior air regarding interior/exterior air switching or a manipulation item for switching to "DEF(defog)." Namely, a season affects selection of the manipulation item.

When a user smokes a cigarette during a commuting time zone, the user is apt to use an air-purifier during the time zone. When a user rides on a sun-heated vehicle, the user is apt to turn on an air-conditioner instead of only turning on an air-blower. Namely, the time zone or the interior/exterior temperature also affects selection of the manipulation item.

When a user becomes sleepy due to fatigue after long driving, the user often lowers setting temperature of an air-conditioner. Thus the user state also affects selection of the manipulation item. Moreover, a navigation system is used not on weekdays but on weekends.

As explained above, the manipulation items to be frequently selected vary depending on the use conditions of the users. A predetermined manipulation item is therefore previously reserved for a predetermined use condition so that the predetermined manipulation item can be displayed when the use condition is met. In detail, at Step 10 in FIG. 4, whether use condition is changed is determined. When the use condition is determined to be changed, the processing proceeds to Step 20. Here, manipulation items according to the use condition are displayed with being rearranged in the variable area 20b. When the use condition is determined to be not changed, the processing proceeds to Step 1. Processing at Steps 1 to 4 is the same as the processing at Steps 1 to 4 in the first embodiment shown in FIG. 3.

Thus the user can easily select a necessary manipulation item that meets the use condition, which results in enhancing user-friendliness. Here, the manipulation items meeting the use condition can be previously registered by the user.

In addition, selection frequency of the manipulation items are displayed at Step 20 is incremented at Steps 1 to 3. As selecting the manipulation items is repeated, an order for displaying is updated and therefore customized to meet preference of the user. The condition change of the season is determined as follows. According to a calendar month, a year is categorized into four categories of January to March, April to June, July to September, and October to December. The change of the use condition of the season is thereby determined by checking the categories.

Similarly, the condition change of the time zone is determined as follows. According to an hour of a day, a day is categorized into, e.g., five categories of 0 hour to 6 hours, 6 hours to 9 hours, 9 hours to 17 hours, 17 hours to 21 hours, and 21 hours to 24 hours. The condition change of the interior/exterior temperature is determined as follows. According to temperature of an interior of a vehicle, temperature condition is categorized into, e.g., five categories of less than 0° C., 0° C. to 10° C., 11° C. to 20° C., 21° C. to 30° C., and more than 30° C. The changes of the above use conditions are thereby determined by checking the categories.

Awakening degree of a user as one of user's state is specified as follows. Based on blinking times per unit period, movement of eyes, or driving period, the awakening degree is categorized into three categories such as high, intermediate, and low level. Similarly, the changes of the use condition is determined by checking the categories.

Furthermore, a day of a week is categorized naturally into seven days, so that the changes of the use condition is determined by checking the categories.

Furthermore, a manipulation item can be determined based on consideration of a plurality of the above use conditions.

(Third Embodiment)

In a third embodiment, the manipulation items are enabled to be altered only under predetermined condition. Namely, if the manipulation item to be displayed is altered according to every change in the selection frequency, it is sometimes less comfortable for the user to select the manipulation item. Consequently, a predetermined condition for altering the manipulation item is set so as to prevent rapid altering of the manipulation item. The user is thereby prevented from being confused at searching for the necessary manipulation item. This processing will be explained below referring to FIG. 5.

Figure 5:
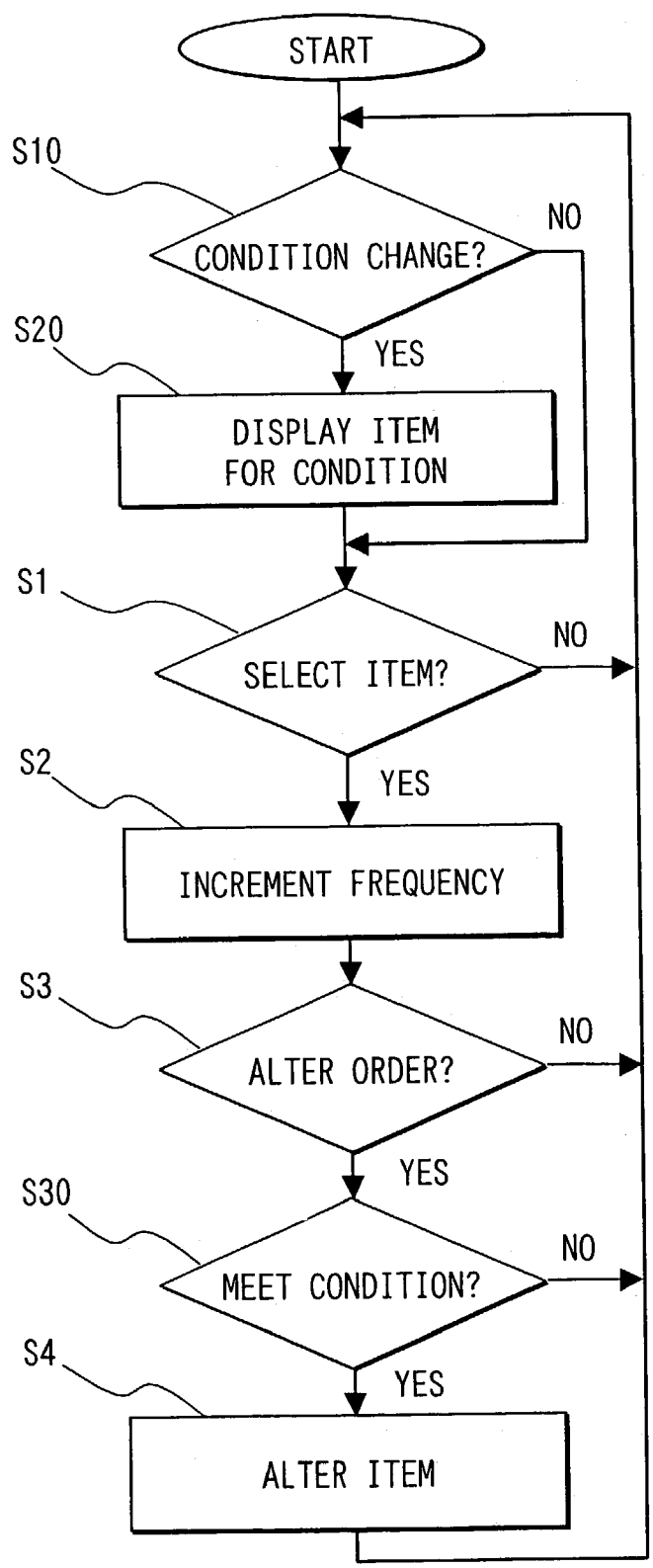
FIG. 5 is a flowchart diagram of an in-vehicle-device control system according to a third embodiment.
Figure 6A:
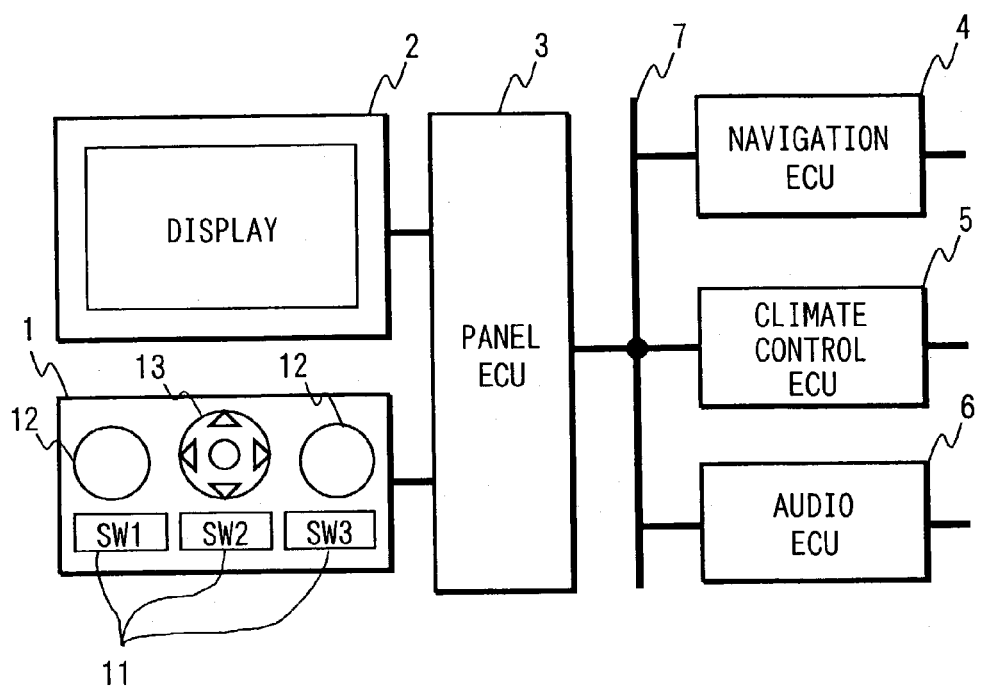
FIG. 6A is a schematic diagram showing related connection of an in-vehicle-device system according to a related art.
Figure 6B:
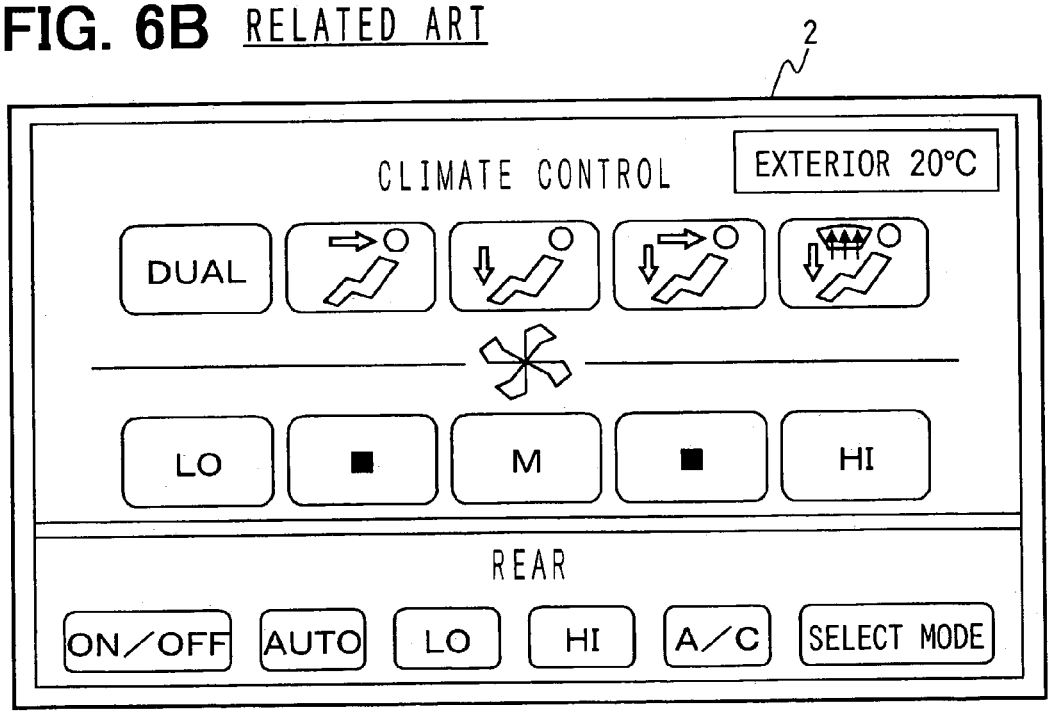
FIG. 6B is a schematic view of a display image of the in-vehicle-device control system according to the related art.

At Step 30 in FIG. 5, whether re-altering condition for altering order of the manipulation items is met is determined. The re-altering condition is related to period or frequency, e.g., whether an elapsed period from the preceding altering of the manipulation items exceeds a predetermined elapsed period, or whether difference in number of times of selection frequency from the preceding altering of the manipulation items exceeds a predetermined number of times. The predetermined elapsed period or the predetermined number of times can be previously registered or arbitrarily registered by the user.

At Step 30, the re-altering condition is determined to be met, the processing proceeds to Step 4, where the manipulation items to be displayed is altered. When the re-altering condition is determined to be not met, the processing returns to Step 10. Processing excluding processing at Step 30 in FIG. 5 is the same as the processing in the second embodiment, so that explanation is abbreviated here.

What is claimed is:

1. An in-vehicle-device control system, comprising:
   displaying means for displaying a plurality of manipulation items, wherein the displaying means includes a variable area where a first part of the manipulation items that are variable are displayed, and a constant area where a second part of the manipulation items that are constant are displayed;
   selecting means through which the user selects a necessary manipulation item displayed on the displaying means, wherein the necessary manipulation item is included in any one of the first part and the second part of the manipulation items;
   signal outputting means for outputting a manipulation signal corresponding to the necessary manipulation item selected by the selecting means;
   controlling means for controlling the in-vehicle device to operate based on the manipulation signal corresponding to the necessary manipulation item outputted by the signal outputting means;
   altering means for altering the first part of the manipulation items in the variable area based on a use condition for the first part of the manipulation items;
   wherein the use condition for the first part of the manipulation items includes selection frequency at which each of the first part of the manipulation items is selected by the user, and
   wherein the altering means re-arranges the first part of the manipulation items based on the selection frequency;
   the in-vehicle-device control system further comprising:
   prohibiting means for prohibiting the first part of the manipulation items from being re-altered when a predetermined condition is inadequate,
   wherein prohibiting of the first part of the manipulation items from being re-altered is released when at least one of two predetermined conditions are adequate,
   wherein one of the two predetermined conditions is that an elapsed period from preceding altering of the first part of the manipulation items exceeds a predetermined period, and
   wherein the other of the two predetermined conditions is that difference in number of times of the selection frequency from the preceding altering of the first part of the manipulation items exceeds a predetermined number of times.

2. An in-vehicle-device control system controlling an in-vehicle device for serving a user in a vehicle, comprising:
   displaying means for displaying a plurality of manipulation items, wherein the displaying means includes a variable area where a first part of the manipulation items that are variable are displayed, and a constant area where a second part of the manipulation items that are constant are displayed;
   selecting means through which the user selects a necessary manipulation item displayed on the displaying means, wherein the necessary manipulation item is included in any one of the first part and the second part of the manipulation items;
   signal outputting means for outputting a manipulation signal corresponding to the necessary manipulation item selected by the selecting means;
   controlling means for controlling the in-vehicle device to operate based on the manipulation signal corresponding to the necessary manipulation item outputted by the signal outputting means;
   altering means for altering the first part of the manipulation items in the variable area based on a use condition for the first part of the manipulation items;
   prohibiting means for prohibiting the first part of the manipulation items from being re-altered when predetermined condition is inadequate;
   wherein prohibiting of the first part of the manipulation items from being re-altered is released when at least one of two predetermined conditions are adequate,
   wherein one of the two predetermined conditions is that an elapsed period from preceding altering of the first part of the manipulation items exceeds a predetermined period, and
   wherein the other of the two predetermined conditions is that difference in number of times of selection frequency, at which each of the first part of the manipulation items is selected by the user, from the preceding altering of the first part of the manipulation items exceeds a predetermined number of times.

3. An in-vehicle-device control system controlling an in-vehicle device for serving a user in a vehicle, comprising:
   displaying means for displaying a plurality of manipulation items, wherein the displaying means includes a variable area where a first part of the manipulation items that are variable are displayed, and a constant area where a second part of the manipulation items that are constant are displayed;
   selecting means through which the user selects a necessary manipulation item displayed on the displaying means, wherein the necessary manipulation item is included in any one of the first part and the second part of the manipulation items;
   signal outputting means for outputting a manipulation signal corresponding to the necessary manipulation item selected by the selecting means;
   controlling means for controlling the in-vehicle device to operate based on the manipulation signal corresponding to the necessary manipulation item outputted by the signal outputting means; and
   altering means for altering the first part of the manipulation items in the variable area based on a use condition for the first part of the manipulation items;
   altering the second part of the manipulation items.

* * * * *